(12) United States Patent
Lu et al.

(10) Patent No.: US 6,378,203 B1
(45) Date of Patent: Apr. 30, 2002

(54) METHOD OF MAKING FLUID HEAT EXCHANGER

(75) Inventors: James W. B. Lu, Hacienda Hts.; Homayoun Sanatgar, Alta Loma; Neil Holt, Crestline; Gary F. Johnson, Santa Clarita, all of CA (US)

(73) Assignee: Thermal Dynamics Corporation, Ontario, CA (US)

( * ) Notice: Subject to any disclaimer, the term of this patent is extended or adjusted under 35 U.S.C. 154(b) by 0 days.

(21) Appl. No.: 09/520,889

(22) Filed: Mar. 7, 2000

(51) Int. Cl.⁷ .............................................. B23P 15/26
(52) U.S. Cl. .............................. 29/890.039; 29/890.054
(58) Field of Search .................... 29/890.038, 890.039, 29/890.054; 228/183; 165/148

(56) References Cited

U.S. PATENT DOCUMENTS

| | | | |
|---|---|---|---|
| 5,182,856 A | * 2/1993 | Armbruster | 29/890.039 |
| 5,507,338 A | * 4/1996 | Schornhorst et al. | 165/153 |
| 5,864,112 A | * 1/1999 | Blomgren et al. | 29/890.054 |
| 6,199,750 B1 | * 3/2001 | Kouno et al. | 228/183 |
| 6,220,497 B1 | * 4/2001 | Benz et al. | 228/183 |

* cited by examiner

Primary Examiner—I Cuda Rosenbaum
(74) Attorney, Agent, or Firm—Gary Appel

(57) ABSTRACT

An aluminum alloy fluid heat exchanger comprises first and second elongate, generally flat, aluminum alloy fluid heat exchanger tubes, each having an upper and a lower surface and having a fluid port inlet and a fluid port outlet. The first tube has a series of small protrusions formed at its lower surface and the second tube has a matching series of protrusions formed at its upper surface, the first tube being stacked on top of the second tube with the protrusions on the first tube in contact with the protrusions on the second tube. A thin sheet of a dissimilar metal, preferably cold rolled steel having a thickness of about 0.3 millimeters is installed between the protrusions on the first and second tubes. The protrusions provide a spacing of at least about 0.42 millimeters between major portions of the first and second heat exchanger tubes. A corresponding method of constructing an aluminum alloy heat exchanger is described.

15 Claims, 3 Drawing Sheets

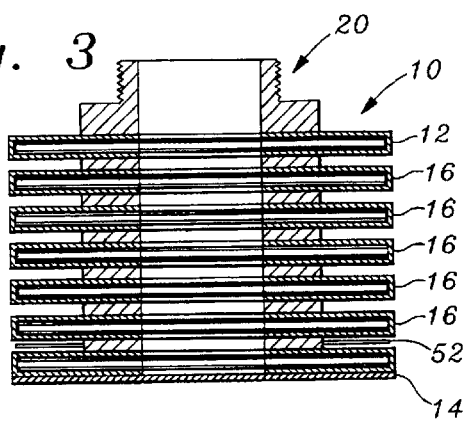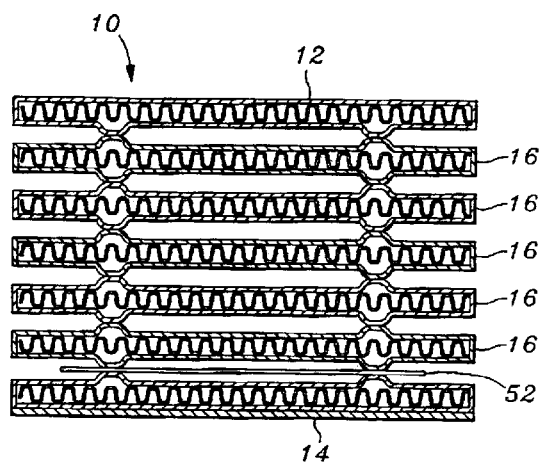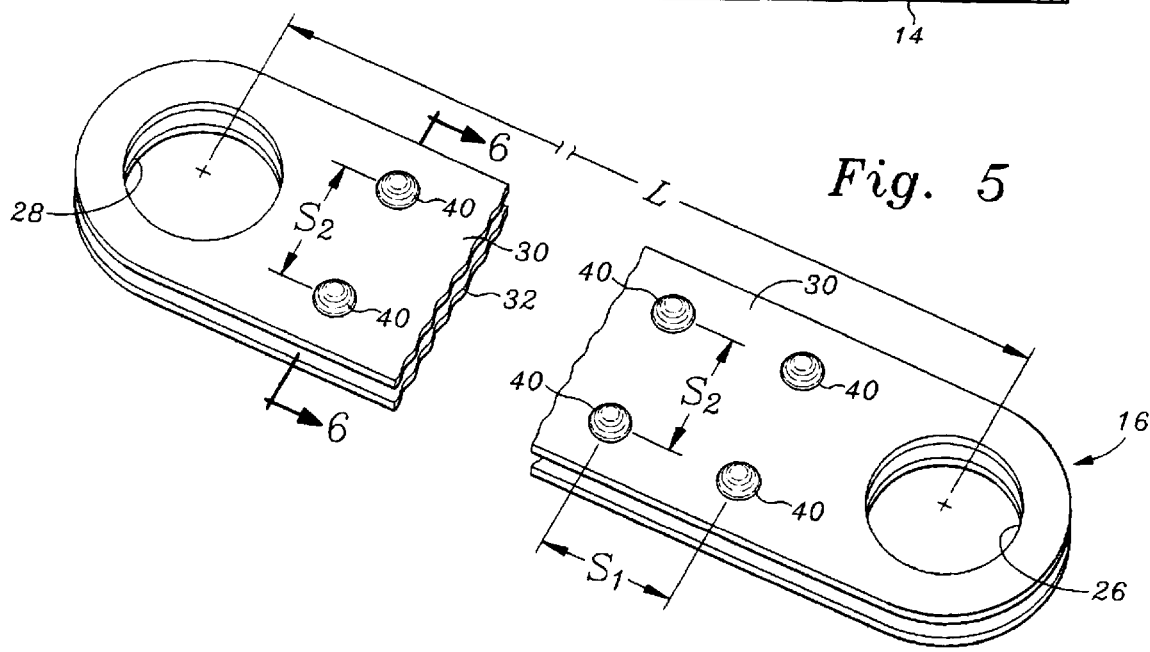

METHOD OF MAKING FLUID HEAT EXCHANGER

BACKGROUND OF THE INVENTION

1. Field of the Invention

The present invention relates generally to the field of heat exchangers, more particularly to submersible heat exchangers, and still more particularly to submersible oil heat exchangers.

2. Background Discussion

Many types of heat exchangers are in general use. Included are heat exchangers used in refrigeration and air conditioning systems and water-filled heat exchangers (i.e., radiators) used for cooling water-cooled internal combustion engines. Further included are air and water-cooled heat exchangers, which are used, for example, in conjunction with vehicle, boat and aircraft engine oil and transmission fluid systems.

Oil heat exchangers (including engine oil and transmission fluid heat exchangers, to which the present invention is principally addressed) may be of non-submersible or submersible types. Nonsubmersible oil coolers ordinarily depend upon a cross flow of air to cool the oil flowing through the heat exchanger. Such air-cooled heat exchangers usually require the heat exchangers to be moving rapidly through or relative to the airflow for efficient oil cooling. In contrast, submersible oil coolers depend upon a flow of another fluid, typically water, to cool oil flowing through the heat exchanger. As an example of submersible heat exchangers, many vehicles employ a transmission fluid heat exchanger installed within the engine radiator. The engine-driven water pump circulates radiator water across the oil heat exchanger to cool oil flowing through the heat exchanger; the water is, in turn, cooled by air flowing between coils of the radiator.

Submersible heat exchangers may comprise a stack of relatively flat tubes. A fluid inlet end of each tube is connected to a fluid inlet fitting or manifold and a fluid outlet end of each tube is connected to a fluid outlet fitting or manifold. The tubes are separated by spacers of some type at a distance apart sufficient for enabling an efficient cooling flow of, for example, cooling water, to flow over, across, and around the heat exchanger tubes.

Of course, for effective and efficient transfer of heat from the fluid flowing through the heat exchanger and the flow of cooling fluid, such as water, the material used for construction of the heat exchanger tubes should have a high thermal conductivity.

Submersible heat exchangers, especially oil heat exchangers, commonly utilize oil flow tubes made from stainless steel, which have reasonably good thermal conductivity as well as resistance to corrosion by cooling water. Moreover, the fabrication assembly of stainless steel tubes and inlet and outlet fittings is comparatively easy by use of known brazing processes.

Submersible heat exchangers made from aluminum alloy would have better heat transfer characteristics than those made from stainless steel and would be both lighter in weight and be much less costly material-wise than stainless steel heat exchangers. However, assembly of aluminum alloy heat exchangers has heretofore been very difficult because the assembly brazing process typically used has resulted in the burning through of some of the aluminum alloy tubes used. The resulting holes in the heat exchanger tubes permit fluid flowing through the tubes to leak into the cooling fluid and cooling fluid may leak into the fluid being cooled, thereby contaminating it.

It is, therefore, a principal objective of the present invention to provide a method of constructing an aluminum alloy, submersible heat exchanger that enables the use of a conventional aluminum brazing process while eliminating the burn-through defects of any of the aluminum alloy heat exchanger tubes. Another principal objective is to provide an aluminum alloy heat exchanger made by such a construction method.

SUMMARY OF THE INVENTION

In accordance with the present invention there is provided a method of constructing a fluid heat exchanger, the method broadly comprising the steps of constructing first and second elongate, generally flat, fluid heat exchanger tubes from an aluminum alloy, each tube having an upper and a lower surface and having a fluid inlet port and a fluid outlet port, the first tube having a series of small protrusions formed at its lower surface and the second tube having a matching series of protrusions formed at its upper surface.

Included in the construction method are the steps of cladding a brazing alloy to each of the protrusions formed on the lower surface of the first tube and to each of the protrusions formed on the upper surface of the second tube, and installing a thin sheet of a dissimilar metallic material on top of the protrusions formed at the upper surface of the second tube.

Further comprising the method are the steps of stacking the first tube on top of the sheet of dissimilar metallic material with the protrusions at the lower surface of the first tube aligned with the protrusions at the upper surface of the second tube so as to form a stacked assembly, and subjecting the stacked assembly to a temperature and for a length of time sufficient to braze the first and second tubes to the sheet of dissimilar metal.

The construction method also includes the step of connecting a fluid inlet fitting at the fluid inlet of the tubes and connecting a fluid outlet fitting at the fluid outlet of the tubes. Preferably, there is included the step of forming the protrusions at the lower surface of the first tube and the protrusions at the upper surface of the second tube by dimpling the material from which the first and second tubes are made.

Also preferably, the subjecting step includes subjecting the stacked tube assembly, in a brazing oven, to a Nocolok® brazing process temperature.

Preferably, the dissimilar metallic material is cold rolled steel having a thickness of about 0.3 millimeters. Also, the protrusions are preferably formed so as to provide a spacing of at least about 1 millimeter between major portions of the first and second heat exchanger tubes.

In accordance with an embodiment of the invention, the heat exchanger construction method comprises the steps of constructing similar, top and bottom elongate, generally flat fluid heat exchanger tubes from an aluminum alloy, the top and bottom heat exchanger tubes each having an upper and a lower surface and having a fluid inlet and a fluid outlet. The top tube has a series of small protrusions formed at its lower surface and the bottom tube has a matching series of protrusions formed at its upper surface.

The construction method further includes constructing at least one intermediate elongate, generally flat heat exchanger tube from an aluminum alloy. The at least one intermediate heat exchanger tube is similar to the top and bottom heat exchanger tubes and has an upper and a lower surface and a fluid inlet and a fluid outlet. The at least one intermediate heat exchanger tube has a series of small protrusions formed at both its upper and lower surfaces, the protrusions matching the protrusions formed on the top and bottom heat exchanger tubes.

Included are the steps of applying a brazing flux to each of the protrusions formed on the top tube, on the bottom tube and on the at least one intermediate tube, and stacking the at least one intermediate tube on top of the bottom tube and stacking the top tube on top of the at least one intermediate tube, and installing a thin sheet of a dissimilar metal between any adjacent pair of the stacked tubes on the protrusions formed on the upper surface of the tube immediately beneath the sheet.

According to the method, the step of cladding a brazing alloy to each of the protrusions formed on the lower surface of each adjacent pair of stacked tubes, and on the protrusions formed on the upper surface of the tube beneath the sheet is included, as is the step of subjecting the stacked heat exchanger tubes to a temperature and for a length of time sufficient to braze together the top tube, the bottom tube, the at least one intermediate tube and the thin sheet of dissimilar metal.

Also preferably included is the step of forming the protrusions on the top tube, the bottom tube and the at least one intermediate tube by dimpling the material from which all of tubes are made. The subjecting step preferably includes passing the stacked tubes through a brazing oven at a Nocolok® brazing process temperature.

Preferably, the protrusions are formed on the heat exchanger tubes so as to provide a spacing of at least about 1 millimeter between major portions of each adjacent pair of stacked tubes. The construction method may include installing the thin sheet of dissimilar metal on top of the bottom tube and underneath a lowermost one of the at least one intermediate tube.

An aluminum alloy heat exchanger made in accordance with the construction method comprises first and second elongate, generally flat, aluminum alloy fluid heat exchanger tubes. Each of the tubes have an upper and a lower surface and have a fluid inlet and a fluid outlet. The first tube has a series of small protrusions formed at the lower surface and the second tube has a matching series of protrusions formed at the upper surface. The first tube is stacked on top of the second tube with the protrusions on the first tube in contact with the protrusions on the second tube. The tube protrusions preferably provide a spacing of at least about 0.42 millimeter between major portions of the first and second heat exchanger tubes.

A thin sheet of a dissimilar metal is installed between the protrusions on the first and second tubes, the sheet being preferably cold rolled steel having a thickness of about 0.3 millimeters.

The heat exchanger may include a stack of an aluminum alloy top heat exchanger tube, an aluminum alloy bottom heat exchanger tube and at least one aluminum alloy intermediate heat exchanger tube. The sheet of dissimilar metal may be installed between any adjacent pair of tubes and more than one sheet of dissimilar metal mar be installed between more than one adjacent pair of stacked tubes.

BRIEF DESCRIPTION OF THE DRAWINGS

The present invention can be more readily understood by a consideration of the following detailed description when taken in conjunction with the accompanying drawings, in which:

FIG. 3 is a vertical cross sectional drawing looking along line 3—3 of FIG. 1, showing the internal construction of the heat exchanger at the fluid inlet end thereof;

FIG. 4 is a transverse cross sectional drawing looking along line 4—4 of FIG. 2, showing the separation of the heat exchanger tubes by protrusions formed at upper and lower surfaces of the tubes and showing the installation of a thin sheet of dissimilar metal between the bottom tube and the above-adjacent tube;

FIG. 5 is an partial perspective drawing of a representative one of the heat exchanger tubes showing the general construction thereto;

In the various FIGS., the same elements and features are given the same reference numbers.

DESCRIPTION OF THE PREFERRED EMBODIMENT

Figure 1:
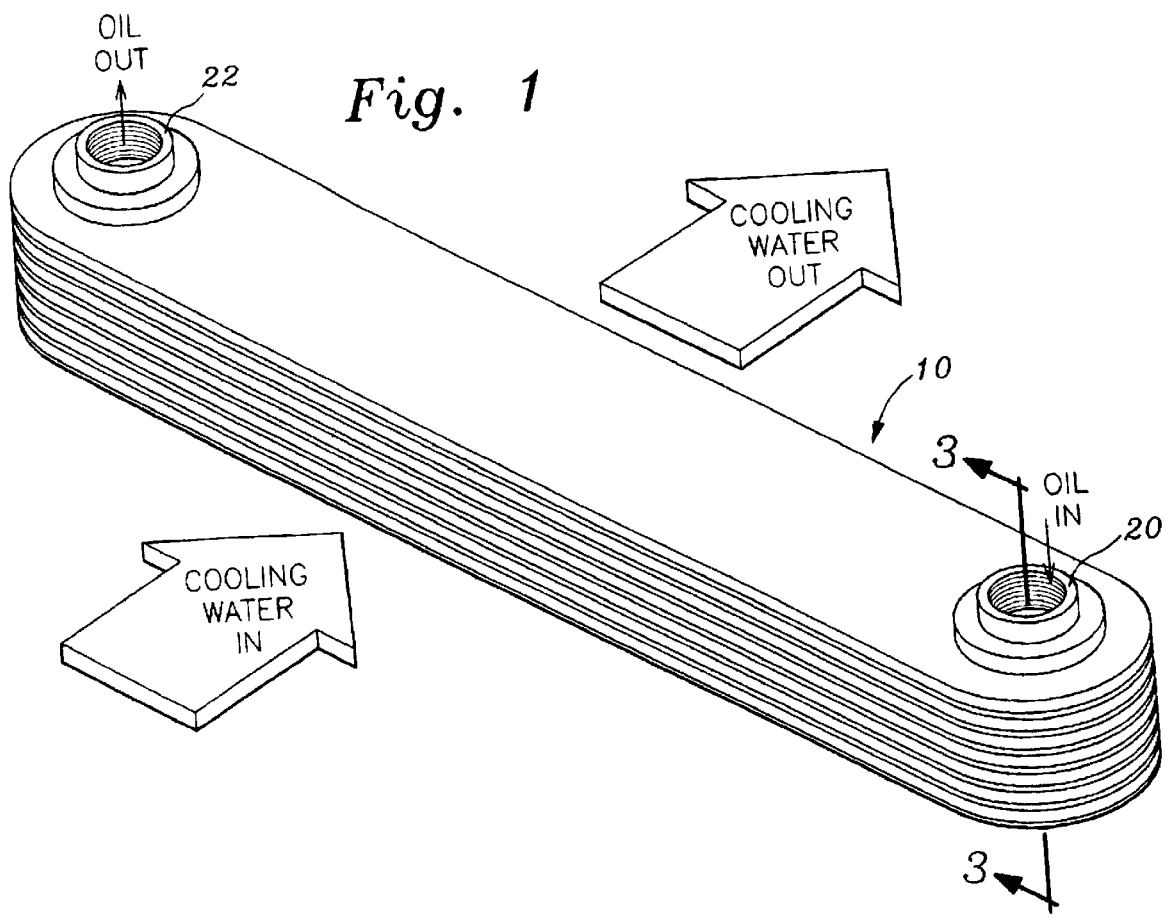
FIG. 1 is a perspective drawing of a submersible heat exchanger of the present invention, showing a stacked arrangement of elongate, generally flat heat exchanger tubes spaced apart to permit a flow of cooling fluid between the tubes and showing fluid inlet and outlet fittings on the heat exchanger.
Figure 2:
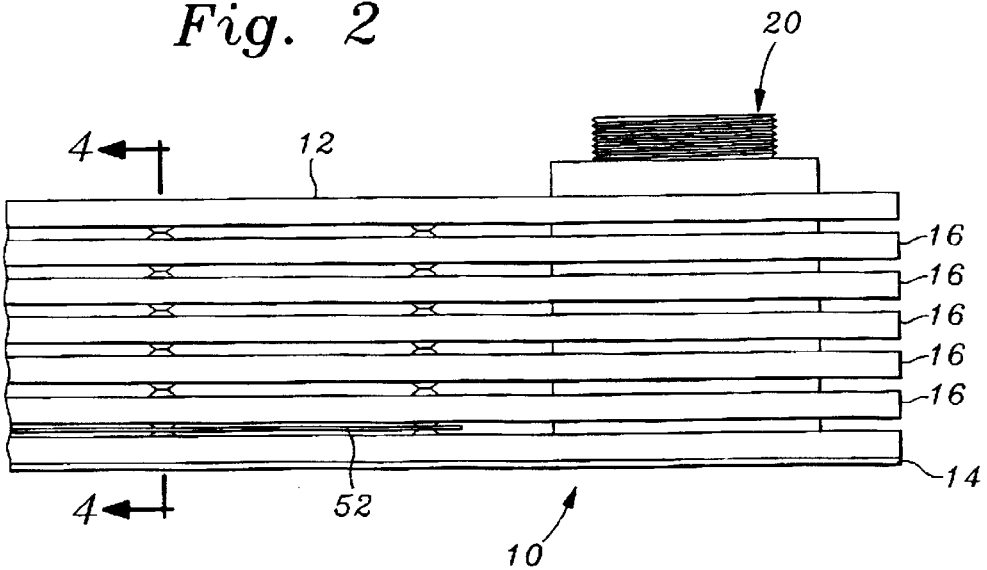
FIG. 2 is a partial side elevation drawing of the heat exchanger of FIG. 1, showing the stacked arrangement of the heat exchanger tubes.

There is shown in perspective in FIG. 1 a heat exchanger, such as a submersible oil heat exchanger, 10 in accordance with a preferred embodiment of the present invention. Comprising heat exchanger 10 (as better seen in FIGS. 2 and 3) are a number of stacked, individual heat exchanger tubes, namely, a top heat exchanger tube 12, a bottom heat exchanger tube 14 and a plurality (five shown) of intermediate heat exchanger tubes 16.

Also shown in FIG. 1 are a heat exchanger fluid inlet fitting 20 and a heat exchanger fluid outlet fitting 22. Both inlet and outlet fittings 20 and 22 are internally threaded for receiving fluid conduits (not shown) by which a fluid to be cooled, for example, oil, is flowed longitudinally through tubes 12, 14 and 16 from inlet to outlet.

As more particularly described below and as shown in FIGS. 1–4, heat exchanger tubes 12, 14 and 16 are stacked in a spaced apart manner. Such spacing is sufficient to permit a cooling fluid, such as water (or even air), to flow between heat exchanger tubes 12, 14 and 16 in a direction perpendicular to the direction of fluid flow through the tubes (FIG. 1) to cool the fluid flowing through the tubes.

Figure 6:
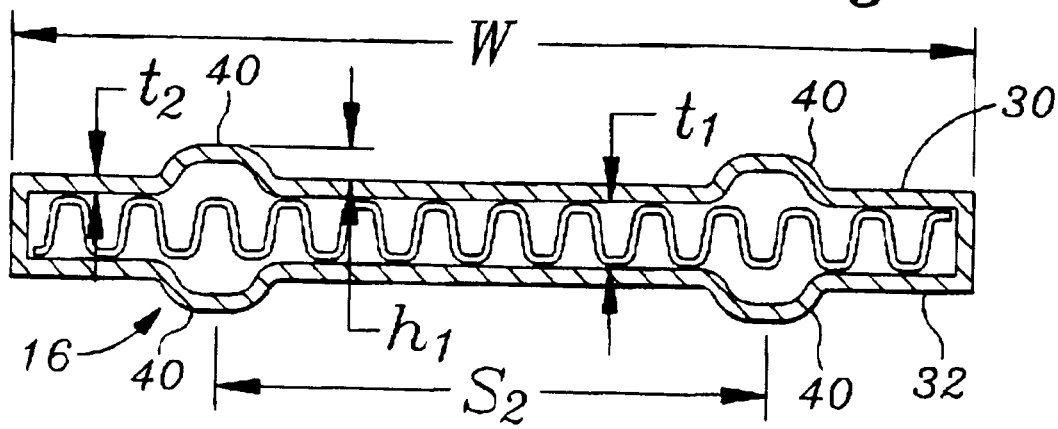
FIG. 6 is a transverse cross sectional drawing looking along line 6—6 of FIG. 5, showing protrusions formed at the upper and lower surfaces of the representative heat exchanger tube.

FIGS. 5 and 6 depict a representative one of intermediate heat exchanger tubes 16. Top and bottom heat exchanger tubes 12 and 14 are preferably identical to intermediate heat exchanger tubes 16 except as specifically described below.

Intermediate heat exchanger tube 16 may, for a representative heat exchanger 10, have an overall length, L, centerto-center of respective inlet and outlet openings 26 and 28, each of which has a inside diameter, D, of about 2.5 centimeters (cm). Heat exchanger tube 16 may have an overall width, w, of about 8 cm and a flow passage thickness, $t_1$, of about 0.3 cm. Intermediate tube 16, as well as tubes 12 and 14, may be formed of aluminum alloy having a thickness, $t_2$, of about 0.05–0.15 cm.

Shown formed at respective upper and lower surfaces 30 and 32 of representative intermediate tube 16 (FIGS. 5 and 6) are a series of longitudinally and transversely spaced apart protrusions 40 that are formed in two parallel rows. These protrusions 40 both space adjacent pairs of the heat exchanger tubes apart and provide connection (that is, brazing) points for the assembly of tubes 12, 14 and 16 together. Preferably protrusions 40 are spaced distances, $s_1$, longitudinally apart and a distance, $s_2$, laterally apart.

Each protrusion 40 has a preferred height, $h_1$, of 0.06 cm. The resulting spacing, $h_2$, between major portions of adjacent stacked and assembled heat exchanger tubes 12, 14 and 16 (FIG. 7), is preferably about twice $h_1$.

It is however to be understood that the dimensions given above are merely representative of one particular heat exchanger 10. Thus, according to fluid cooling requirements, including the fluid type, temperature and flow rate of a fluid to be cooled in the heat exchanger and the fluid type, temperature and flow rate of cooling fluid to be flowed across the heat exchanger, the dimensions may vary widely.

Figure 7:
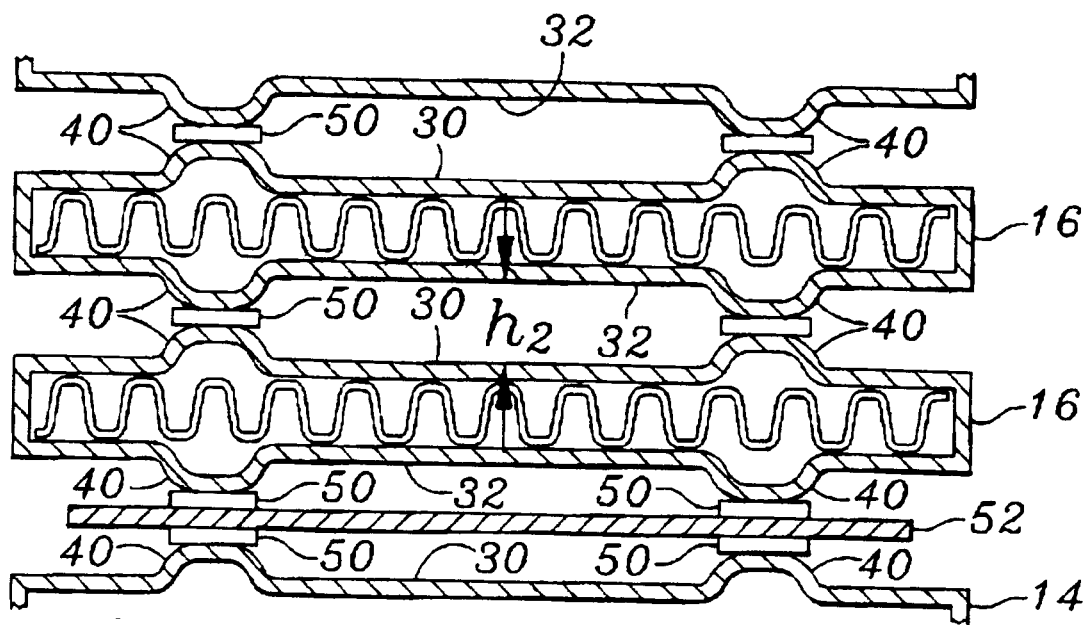
FIG. 7 is a transverse cross sectional drawing similar to FIG. 4, but showing the stacked arrangement of heat exchanger tubes before the brazing step and showing clad brazing alloy installed on the facing protrusions between each pair of stacked tubes and further showing installation of the thin sheet of dissimilar metal between an adjacent pair of stacked tubes with clad brazing alloy on the protrusions facing each side of the metal sheet.

As depicted in FIG. 7, protrusions 40 located on representative heat exchanger tube upper surface 30 exactly match the protrusions located on its lower surface 32. Consequently, when tubes 12, 14 and 16 are stacked on top of one another protrusions 40 on lower surface 32 of one tube rest on the protrusions on upper surface 30 of the below-adjacent tube.

Top tube 12 may (but not necessarily) be constructed with no protrusions 40 on upper surface 30 of the tube and bottom tube 14 may (but not necessarily) be constructed with no protrusions 40 on lower surface 32 of the tube so as to provide the smooth exterior appearance depicted in FIGS. 1, 3 and 4. Bottom heat exchanger tube 14 is, however, formed with a continuous lower surface 32 so as to close the fluid inlet and outlet ends of assembled heat exchanger 10.

For assembly, intermediate heat exchanger tubes 16 are stacked on top of bottom tube 14 (FIG. 7) with the protrusions 40 of one tube directly on top of the protrusions on the next below tube. However, before such tube stacking, each protrusion 40, is clad with brazing alloy 50. When stacking the tubes, the brazing alloy 50, is clad to each abutting pair of protrusions 40.

The present inventor has amazingly discovered that burn-through of any of the aluminum heat exchanger tubes 12, 14 and 16, during the brazing process can be prevented by the installation of a thin sheet 52 of a dissimilar metal, such as cold rolled steel, between protrusions 40 of at least one adjacent pair of heat exchanger tubes as the tubes are being stacked.

By way of example only, with no limitation being intended or implied, sheet 52, preferably having a thickness of only about 0.3 millimeters, is shown in FIG. 7 installed on top of protrusions at upper surface 30 of bottom tube 14. Dissimilar metal sheet 52 may alternatively be installed between any adjacent pair of stacked heat exchanger tubes, or more than one dissimilar metal sheet may be installed between different adjacent pairs of stacked tubes. In any case, brazing clad alloy 50 is coated on protrusions 40 on which sheet 52 rests.

When the heat exchanger tubes 12, 14 and 16, and dissimilar metal sheet (or sheets) 52, are stacked in the above-described manner, the stacked assembly is subjected to a temperature for a length of time to melt the brazing material and braze the assembly together. To accomplish such brazing, the stacked assembly may be passed through a brazing oven at Nocolok® brazing process temperature.

In accordance with the foregoing, an aluminum alloy heat exchanger as well as a method of constructing an aluminum alloy heat exchanger are described.

There has been described and illustrated an aluminum alloy heat exchanger and the method of making the heat exchanger in accordance the present invention for purposes of illustrating the manner in which the invention may be used to advantage. However, it is to be appreciated that the invention is not limited thereto. Therefore, any and all variations and modifications that may occur to those skilled in the applicable art are to be considered as being within the scope and spirit of the claims as appended hereto.

What is claimed is:

1. A method of constructing a fluid heat exchanger, said method comprising the steps of:

constructing first and second, elongate, generally flat fluid heat exchanger tubes from an aluminum alloy, each said tube having an upper and a lower surface and having a fluid port inlet and a fluid port outlet, said first tube having a series of small protrusions formed at said lower surface and said second tube having a matching series of protrusions formed at said upper surface;

applying a clad brazing alloy to each of said protrusions formed on the lower surface of the first tube and to each of said protrusions formed on the upper surface of the second tube; installing a thin sheet of a dissimilar metal on top of the protrusions formed at the upper surface of the second tube;

stacking the first tube on top of said sheet of dissimilar metal with the protrusions at the lower surface of the first tube aligned with the protrusions at the upper surface of the second tube so as to form a stacked assembly;

subjecting said stacked assembly to a temperature for a length of time sufficient to braze the first and second tubes to the sheet of dissimilar metal.

2. The method of constructing a fluid heat exchanger as claimed in claim 1, including the step of forming said protrusions at the lower surface of the first tube and said protrusions formed at the upper surface of the second tube by dimpling the material from which the first and second tubes are made.

3. The method of constructing a fluid heat exchanger as claimed in claim 1, wherein said temperatures are Nocolok® brazing process temperatures.

4. The method of constructing a fluid heat exchanger as claimed in claim 1, including the step of connecting a fluid inlet fitting at said fluid inlet of said tubes and connecting a fluid outlet fitting at said fluid outlet of said tubes.

5. The method of constructing a fluid heat exchanger as claimed in claim 1, wherein said dissimilar metal is cold rolled steel.

6. The method of constructing a fluid heat exchanger as claimed in claim 1, wherein the sheet of dissimilar metal has a thickness of about 0.3 millimeters.

7. The method of constructing a fluid heat exchanger as claimed in claim 1, wherein said protrusions are formed so as to provide a spacing of at least about 1 millimeter between major portions of said first and second heat exchanger tubes.

8. A method of constructing a fluid heat exchanger, said method comprising the steps of:

constructing similar, top and bottom elongate, generally flat fluid heat exchanger tubes from an aluminum alloy, each said top and bottom heat exchanger tube having an upper and a lower surface and having a fluid inlet and a fluid outlet, said top tube having a series of small protrusions formed at said lower surface and said bottom tube having a matching series of protrusions formed at said bottom tube upper surface;

constructing at least one intermediate elongate, generally flat fluid heat exchanger heat exchanger tube from an aluminum alloy, said at least one intermediate heat exchanger tube being similar to said top and bottom heat exchanger tubes and having an upper and a lower surface and having a fluid inlet and a fluid outlet, said top tube having a series of small protrusions formed at both said upper and lower surfaces, said protrusions matching the protrusions formed on said top and bottom heat exchanger tubes;

applying a clad brazing alloy to each of said protrusions formed on said top tube, on said bottom tube and on said at least one intermediate tube;

stacking said at least one intermediate tube on top of said bottom tube and stacking said top tube on top of said at least one intermediate tube installing a thin sheet of a dissimilar metal between any adjacent pair of said stacked tubes on the protrusions formed on the upper surface of the tube immediately beneath said sheet;

installing clad brazing alloy elements on said protrusions formed on the lower surface of each adjacent pair of stacked tubes, and on said protrusions formed on the upper surface of said tube beneath said sheet; and subjecting said stacked heat exchanger tubes to a temperature and for a length of time sufficient to braze all of said top tube, said bottom tube, said at least one intermediate tube and said thin sheet of dissimilar metal together.

9. The method of constructing a fluid heat exchanger as claimed in claim 8, including the step of forming said protrusions on said top tube, said bottom tube and said and at least one intermediate tube by dimpling the material from which all of said tubes are made.

10. The method of constructing a fluid heat exchanger as claimed in claim 8, wherein said subjecting step includes passing said stacked tubes through a brazing oven at temperatures congruent with the Nocolok® brazing process temperature.

11. The method of constructing a fluid heat exchanger as claimed in claim 8, wherein the step of forming said top tube, said bottom tube and said at least one intermediate tube includes dimpling the material from which all of said tubes are made so as to form said protrusions.

12. The method of constructing a fluid heat exchanger as claimed in claim 8, including the step of connecting a fluid inlet fitting at said fluid inlet of said tubes and connecting a fluid outlet fitting at said fluid outlet of said tubes.

13. The method of constructing a fluid heat exchanger as claimed in claim 8, wherein said sheet of dissimilar metal is cold rolled steel having a thickness of about 0.3 millimeters.

14. The method of constructing a fluid heat exchanger as claimed in claim 8, wherein said protrusions are formed so as to provide a spacing of at least about 1 millimeter between major portions of each adjacent pair of stacked heat exchanger tubes.

15. The method of constructing a fluid heat exchanger as claimed in claim 8, wherein said thin sheet of dissimilar metal is installed on top of said bottom tube and underneath a lowermost one of said at least one intermediate tube.

* * * * *